US011965294B2

(12) United States Patent
Schlessel

(10) Patent No.: US 11,965,294 B2
(45) Date of Patent: *Apr. 23, 2024

(54) CONCRETE TEXTURING DEVICES AND METHODS

(71) Applicant: TRI MOR CORPORATION, Twinsburg, OH (US)

(72) Inventor: Martin Schlessel, Twinsburg, OH (US)

(73) Assignee: TRI MOR CORPORATION, Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,705

(22) Filed: Feb. 20, 2023

(65) Prior Publication Data
US 2023/0203763 A1 Jun. 29, 2023

Related U.S. Application Data

(63) Continuation of application No. 15/930,585, filed on May 13, 2020, now Pat. No. 11,613,854.

(60) Provisional application No. 62/852,491, filed on May 24, 2019.

(51) Int. Cl.
*E01C 19/43* (2006.01)
*B62D 55/06* (2006.01)
*B62D 55/24* (2006.01)
*E04F 21/24* (2006.01)

(52) U.S. Cl.
CPC .............. *E01C 19/43* (2013.01); *B62D 55/06* (2013.01); *B62D 55/244* (2013.01); *E04F 21/241* (2013.01); *E04F 21/244* (2013.01)

(58) Field of Classification Search
CPC ...... E01C 19/43; E04F 21/241; E04F 21/244; B62D 55/06; B62D 55/244
USPC ................................................ 404/75, 89, 93
See application file for complete search history.

(56) References Cited

U.S. PATENT DOCUMENTS

| | | | |
|---|---|---|---|
| 3,703,857 A | 11/1972 | MacKinnon | |
| 4,132,492 A | 1/1979 | Jenkins | |
| 4,674,048 A | 6/1987 | Okumura | |
| 4,747,174 A * | 5/1988 | Hightower | E01H 1/02 15/49.1 |
| 4,789,265 A | 12/1988 | Wilson | |
| 4,917,533 A | 4/1990 | Wilson | |
| 5,023,788 A | 6/1991 | Kitzaume et al. | |
| 5,129,803 A | 7/1992 | Nomura et al. | |
| 5,549,413 A * | 8/1996 | Bolden | E01C 19/43 404/93 |
| 5,638,656 A | 6/1997 | Roe | |
| 6,022,171 A | 2/2000 | Munoz | |
| 6,088,865 A | 7/2000 | Truan et al. | |
| 6,336,769 B1 | 1/2002 | Cincis et al. | |
| 6,679,652 B2 | 1/2004 | Suriano | |
| 8,708,598 B2 | 4/2014 | Hanson et al. | |

(Continued)

FOREIGN PATENT DOCUMENTS

CN 104088217 A 10/2014
CN 203919320 U 11/2014
(Continued)

*Primary Examiner* — Raymond W Addie
(74) *Attorney, Agent, or Firm* — Hahn Loeser & Parks LLP

(57) ABSTRACT

Concrete texturing devices for use on an uncured concrete slab. The concrete texturing devices have a device body, one or more drive systems, at least one articulating arm, and at least one texturing structure. Also disclosed are methods of use.

19 Claims, 7 Drawing Sheets

(56) References Cited

U.S. PATENT DOCUMENTS

| | | | |
|---|---|---|---|
| 9,835,610 B2 | 12/2017 | Kangas | |
| 9,982,400 B1 * | 5/2018 | Davis | E01C 19/178 |
| 10,060,900 B2 | 8/2018 | Kangas | |
| 10,321,754 B1 * | 6/2019 | McCaughey | B08B 1/002 |
| 11,149,387 B2 * | 10/2021 | Kitano | A46B 3/14 |
| 2001/0048850 A1 | 12/2001 | Quenzi et al. | |
| 2002/0192026 A1 | 12/2002 | Somero et al. | |
| 2004/0247390 A1 | 12/2004 | Smith | |

FOREIGN PATENT DOCUMENTS

| | | |
|---|---|---|
| CN | 205000617 U | 1/2016 |
| CN | 107044203 A | 8/2017 |
| JP | 2742790 B2 | 4/1998 |
| JP | 2016176203 A | 10/2016 |
| JP | 6216090 B1 | 10/2017 |
| JP | 2017179821 A | 10/2017 |
| JP | 2018012943 A | 1/2018 |

\* cited by examiner

CONCRETE TEXTURING DEVICES AND METHODS

This patent application is a continuation of, and claims priority to and the benefit of, U.S. patent application Ser. No. 15/930,585, filed May 13, 2020, which claims priority to and the benefit of U.S. Provisional Application No. 62/852,491, filed May 24, 2019, which are all incorporated herein by reference.

BACKGROUND

This disclosure relates to concrete finishing and, more specifically, concrete texturing devices and methods for using the same on an uncured concrete slab.

Concrete finishing is the process of working the surface of a concrete slab to provide a desired finish. Concrete slabs may be finished with a smooth surface, such as by way of a trowel. Concrete slabs may also be textured, such as by way of a broom. Adding texture to a concrete slab occurs after screeding, floating, and bleeding the concrete. Once the bleed water has dissipated the concrete slab may be textured. Because the concrete slab has not yet cured the surface of the concrete may still be manipulated and a texture may be applied. However, once the concrete slab has cured the concrete surface may no longer be textured. Accordingly, present concrete finishing techniques are labor intensive processes performed under limited time constraints.

Present concrete finishing techniques include pulling a broom across the concrete surface to impart texture into the concrete surface. Typically, the broom is pulled by way of the broom handle. However, for larger slabs the head of a broom may be attached to a float and pulled across a concrete slab by way of a lanyard (e.g. a rope or pulley system) giving way to a potentially inconsistent finish and requiring multiple operators.

SUMMARY

The present disclosure relates to a concrete texturing device for use on uncured concrete slabs. More specifically, the present disclosure describes an automated concrete texturing device that is maneuverable on an uncured concrete slab and may be controlled by a single operator.

In one example of a concrete texturing device, the concrete texture device comprises a device body with one or more drive systems extending therefrom. The one or more drive systems operate upon an uncured concrete surface. The concrete texturing device further comprises a first articulating arm and a second articulating arm. The first articulating arm extends from a first side of the device body and the second articulating arm extends from a second side of the device body. A first texturing structure is attached to the first articulating arm, opposite the device body. A second texturing structure is attached to a second articulating arm, opposite the device body.

In another example of a concrete texturing device, the concrete texture device comprises a device body with one or more drive systems extending therefrom. The one or more drive systems operate upon an uncured concrete surface. The concrete texturing device further comprises at least one articulating arm extending from the device body. A texturing structure is attached to the at least one articulating arm, opposite the device body.

A method for texturing an uncured concrete slab is also disclosed herein. The method for texturing an uncured concrete slab includes the steps of:

positioning a concrete texturing device on a concrete slab, the concrete texturing device comprising:
    a device body with one or more drive systems extending therefrom where the one or more drive systems operate upon an uncured concrete surface,
    at least one articulating arm where the at least one articulating arm extends from the device body, and
    a texturing structure attached to the at least one articulating arm, opposite the device body;
lowering the texturing structure into the uncured concrete slab by way of the at least one articulating arm;
traversing the uncured concrete slab with the concrete texturing device by way of the one or more drive systems with the texturing structure in the uncured concrete slab wherein the concrete texturing device is operated remotely; and
elevating the device body and the one or more drive systems from the uncured concrete slab and changing a direction of travel of the concrete texturing device.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
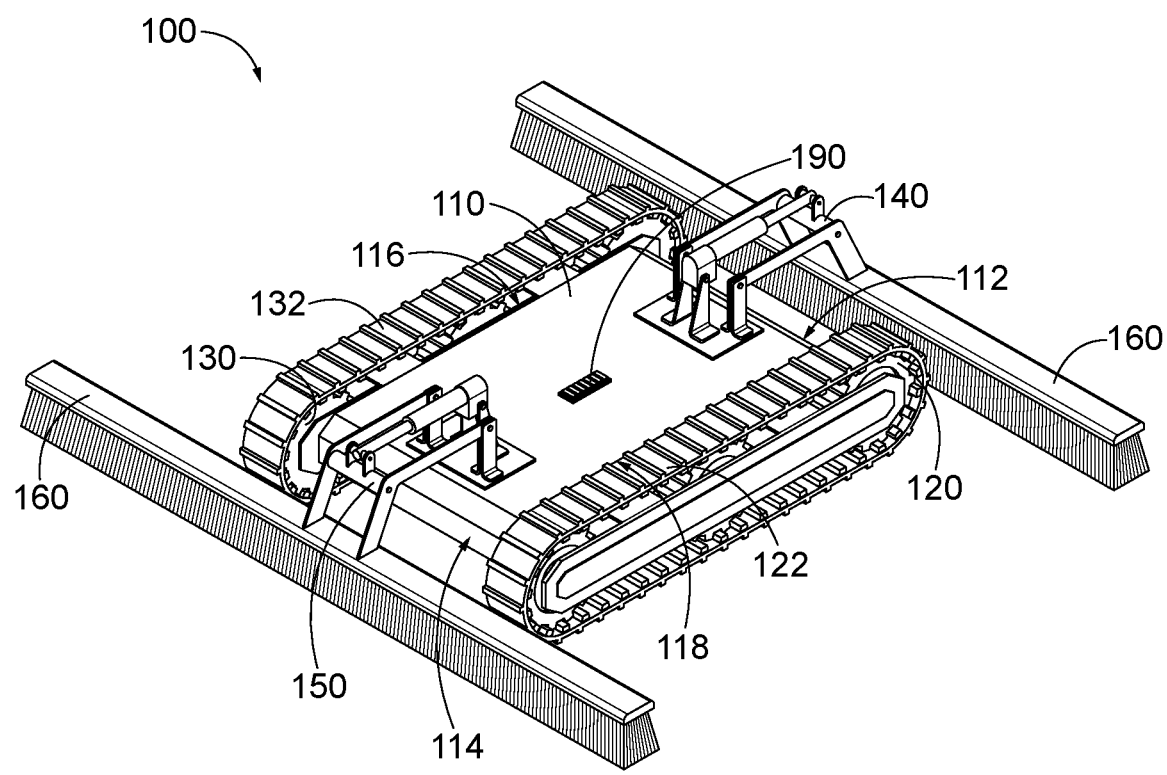
FIG. 1 is a top side perspective view of a concrete texturing device, in accordance with an example of the disclosure.

The concrete finishing process is labor intensive and must be performed under limited time constraints prior to concrete curing or hardening. Even the most practiced concrete finishers find it difficult to accomplish a consistent finish under the limited time constrains. Placing and finishing large concrete slabs, such as roadways, parking areas, industrial floor surfaces, or the like, only increase the obstacles. The surface of a concrete slab must be textured after bleed water has dissipated, while the concrete surface may still be manipulated prior to curing. Because the concrete surface may still be manipulated it cannot withstand foot traffic or maintain the weight of heavy equipment without incurring damage. Thereby, the texturing process generally occurs without the ability of placing an individual or heavy equipment directly on the concrete slab. Instead, a broom may be pulled from one side of the slab to another (e.g. across a sidewalk) by way of the broom handle. On large slabs, which span a width greater than the reach of a single individual, a rope or pulley system may be utilized. By example, the head of a broom may be attached to a float that is pulled from one side of the slab to another by way of the rope or pulley system. Still yet, the rope or pulley system requires at least two individuals positioned to each side of the slab, thereby increasing the labor output at each finishing station. Also, the consistency may be compromised as the rope or pulley system may only control the broom head in a longitudinal direction with limited or no control in the lateral direction. Such a technique also makes it difficult to maneuver and redirect the broom head while on the slab, such as when encountering a wall, a transition, plumbing rough-ins, a drain fixture, or the like. The present disclosure sets out to provide a device and method for use which overcomes each of these obstacles.

Referring to FIGS. 1-4, an example of a concrete texturing device 100 is illustrated. The concrete texturing device 100 comprises drive system(s) 120, 130 which engages the ground. The drive system(s) 120, 130 may comprise one or more track(s) 122, 132 operably connected to a device body 110. The tracks may be rubber tracks forming a continuous track driven by one or more drive wheels and/or drive sprockets. In some examples, the drive system(s) 120, 130 may be the wheels themselves (e.g. rubber tires or the like). In these examples, the track(s) 122, 132 or wheels of the drive system(s) may comprise a tread design for engaging an uncured concrete surface and for producing driving friction between the uncured concrete and concrete texturing device. The driving friction produced between the uncured concrete surface and the concrete texturing device drives the concrete texturing device over the uncured concrete when texturing structure(s) are engaged in the uncured concrete surface. Specific examples of the tread design may be selected based upon the hydration stage of the concrete. Additionally, the tread design may additionally be selected based upon the selected texturing structure being utilized and the coefficient of friction between the uncured concrete surface, the drive systems(s), and/or the texturing structure(s), as will be discussed in greater detail below.

Still referring to FIGS. 1-4, the concrete texturing device 100 further comprises one or more texturing structures 160. In the present example, texturing structures 160 are attached to the device body 110 by way of respective articulating arms 140, 150. As illustrated by FIG. 1, a first articulating arm 140 supports one texturing structure 160 and a second articulating arm 150 supports yet another texturing structure 160. In this example, the first articulating arm 140 extends from a front side 112 of the device body 110 and the second articulating arm 150 extends from a back side 114 of the device body 110, with the texturing structure(s) 160 further extending from the respective articulating arm 140, 150. The articulating arms may be adjustable to control the distance the texturing structure 160 is positioned from the device body, to control the elevation of the texturing structure 160 relative the device body, to control the pitch of the texturing structure 160 relative the uncured concrete surface, and/or to navigate and/or rotate the texturing structure 160 about the device body 110. The adjustability may be set prior to use of the concrete texturing device or may be adjustable while the concrete texturing device is in use.

One example of a texturing structure is a head of a broom. The bristles of the broom impart a texture across the uncured concrete surface when forced into and dragged across the concrete surface. The degree the texturing structure may be forced into the uncured concrete surface may be by way of the weight of the head of the broom, alone, or may be by way of a force applied by the articulating arms, as further discussed below. The extent of texture of the concrete surface may be further adjusted by the density of bristles on the broom and/or whether the broom is a coarse broom, a fine broom, or a combination thereof. Further, the pitch of the head of the broom may further impact the degree of texture of the concrete and is additionally adjustable, as discussed below. Another example of a texturing structure may be tines, such as metal tines. Tines may be used to provide texture on the uncured concrete surface just as described with respect to the broom above. Additional friction structures are also contemplated herein.

By adjusting the articulating arm(s) and, thereby, the texturing structure (e.g. length, elevation, pitch, etc.) the articulating arm(s) control the extent of texture being applied to the uncured concrete surface. In particular, by adjusting the height the articulating arm(s) force the texturing structure into the surface of the uncured concrete, thereby, imparting a texture onto the uncured concrete. The degree of force may additionally or alternatively be controlled by the weight of the texturing structure, the articulating arm, the device body, and/or a combination thereof. Further, the degree of force applied to the uncured concrete surface may additionally or alternatively be controlled by the length of the articulating arm and the position of the texturing structure relative the device body and/or the drive system(s). The adjustable nature of each of these components provide for a texturing application which is balanced with corresponding coefficient of friction between the concrete texturing device and the uncured concrete surface necessary to drive the friction structure across the uncured concrete surface while providing a texture on the uncured concrete surface. It is appreciated here that the amount of force applied to the texturing structure has a residual impact on (e.g. counteracting) the amount of friction between the drive system and the uncured concrete surface. Thereby, each of these control parameters may also be utilized to adjust the amount of friction or contact between the drive system and the uncured concrete surface.

Figure 5:
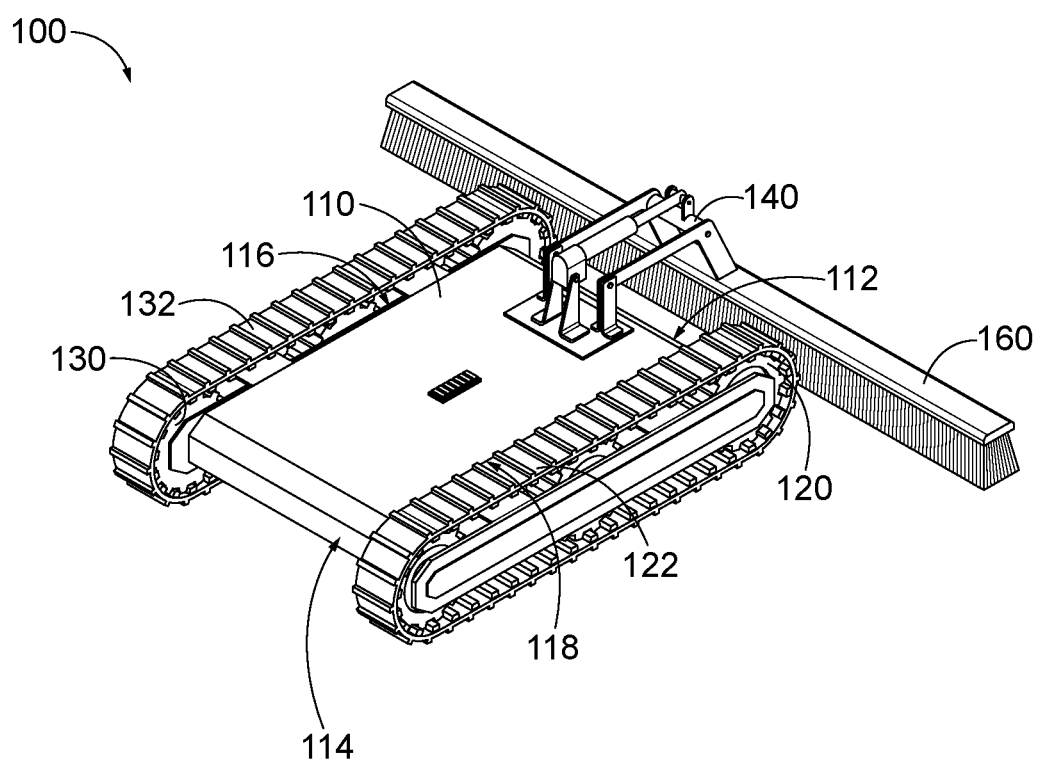
FIG. 5 is a top side perspective view of a concrete texturing device, in accordance with an example of the disclosure.
Figure 6:
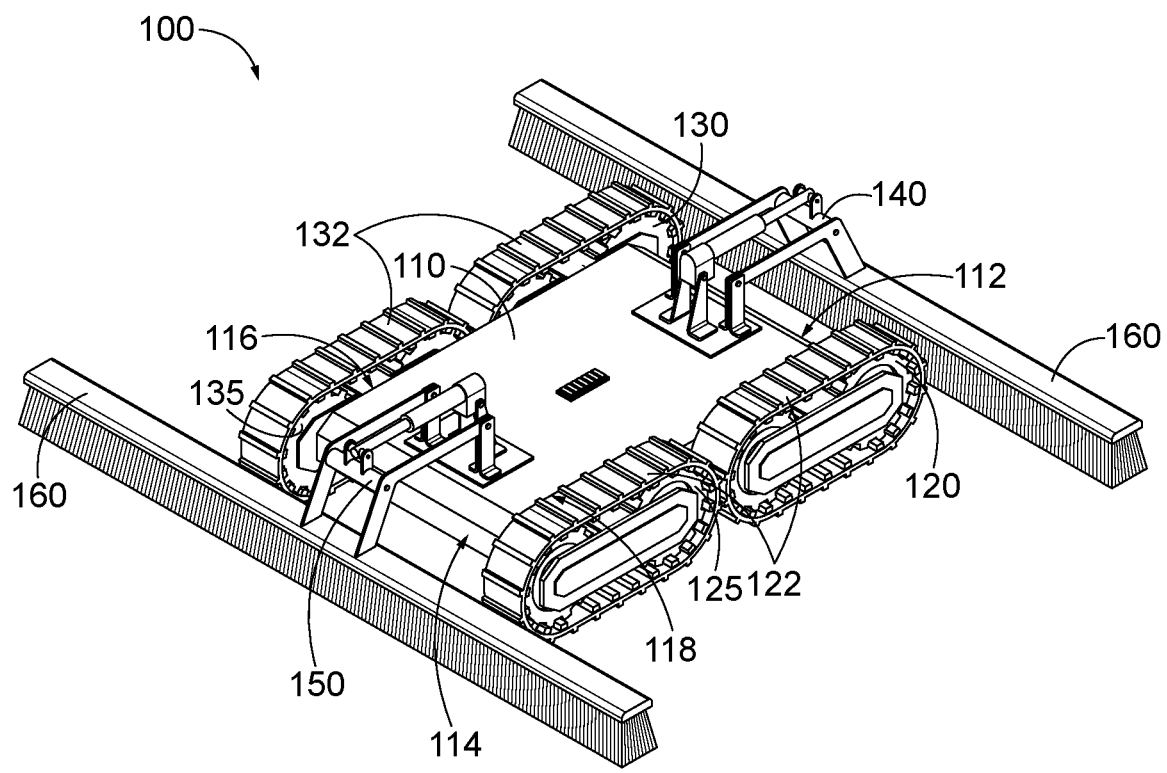
FIG. 6 is a top side perspective view of a concrete texturing device, in accordance with an example of the disclosure.

In the example of FIG. 1, the drive system(s) 120, 130 of the concrete texturing device 100 are positioned to each lateral side 116, 118 of the device body 110. The articulating arms 140, 150 extend the texturing structure(s) 160 from each respective longitudinal end (front side 112 and back side 114) of the device body 110. In the configuration of the example as shown, the concrete texturing device 100 is symmetrical about its longitudinal axis and about its lateral axis. This may be relied on to balance the concrete texturing device 100 in order to provide even distribution of weight on the uncured concrete surface, thereby, limiting any imperfections that might be formed by the drive system 120, 130. As a result, this also reduces the amount of texturing required to resolve or remove any such imperfections resulting from use. FIGS. 1-4 illustrate a concrete texturing device 100 with two drive systems 120, 130 and two articulating arms 140, 150 and two texturing structures 160. FIG. 5 illustrates a concrete texturing device 100, as described with respect to FIG. 1, but with a single articulating arm 140 and a single texturing structure 160. FIG. 6 illustrates a concrete texturing device 100, as described with respect to FIG. 1, but with four drive systems 120, 125, 130, and 135.

Figure 2:
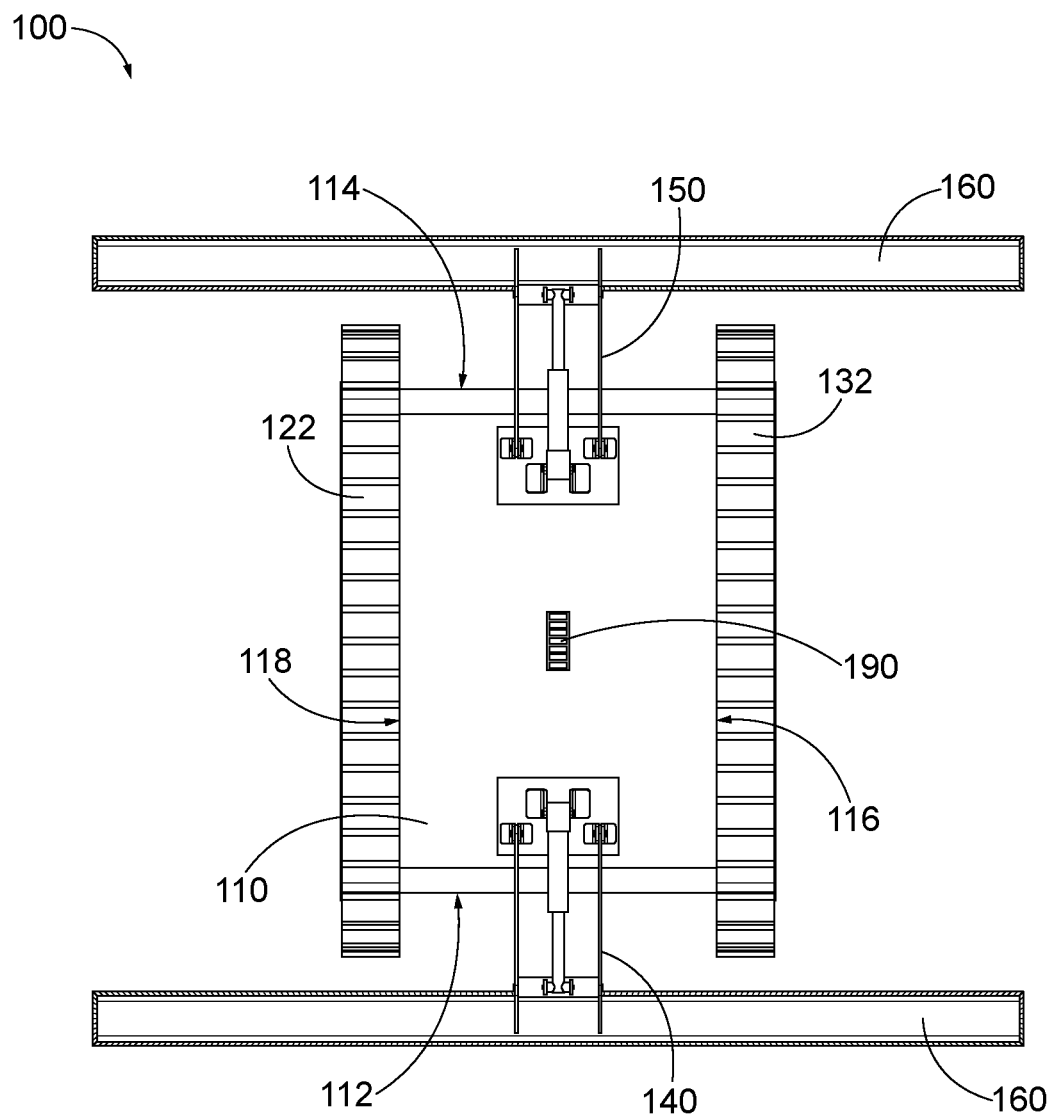
FIG. 2 is a top side view of the concrete texturing device of FIG. 1, in accordance with an example of the disclosure.
Figure 3:
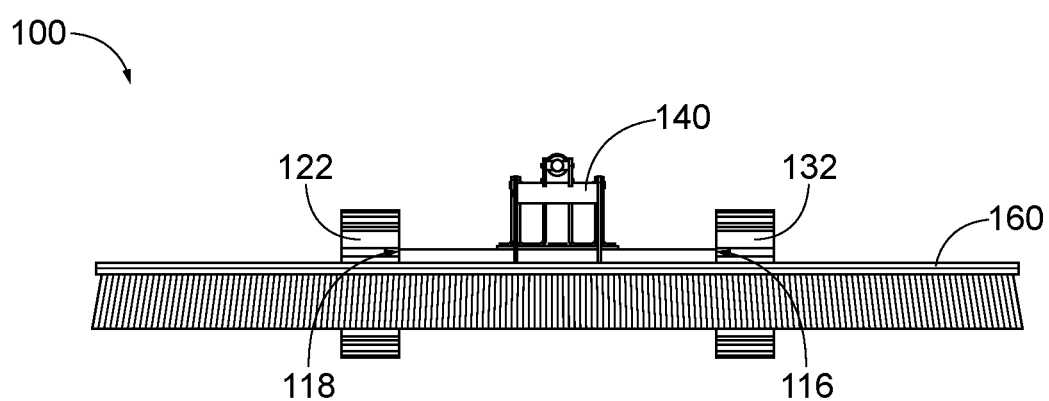
FIG. 3 is an end view of the concrete texturing device of FIG. 1, in accordance with an example of the disclosure.
Figure 4:
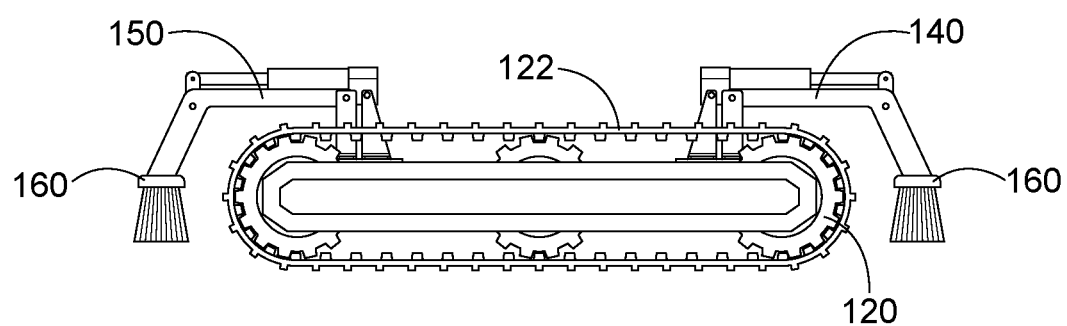
FIG. 4 is a side view of the concrete texturing device of FIG. 1, in accordance with an example of the disclosure.

As further illustrated by the example of FIGS. 1-4, a texturing structure 160 is provided at opposing ends of the device body 110. In operation, only one texturing structure 160 may be used at a time, multiple texturing structures 160 may be used in combination, multiple texturing structures 160 may be alternated, or any combination thereof. In one example of operation, the texturing structure 160 provides a texture on the uncured concrete surface upon being dragged by the concrete texturing device 100 across the uncured concrete surface where the concrete texturing device 100 is operating upon the uncured concrete surface. A texturing structure that is being dragged may positioned to a backside of the device body relative the direction of movement of the device body. The pitch of the texturing structure 160 may be such that the bristles or tines of the texturing structure that engage the concrete surface are angled away from the device body 110 when dragged. In yet another example, the texturing structure 160 may impart a texture on the uncured concrete surface when pushed by the concrete texturing device 100. In this example, the pitch of the texturing structure 160 may be such that the bristles or tines of the texturing structure that engage the concrete surface are angled toward the device body 110 when pushed. The angle of the bristles or tines may be preset in this manner before engaging the concrete surface or may be produced as a result of friction when the concrete texturing device is driven across the concrete surface by the drive system(s). If a more aggressive texture is desired, the bristles or tines may be preset in a direction opposite to that described above. In still yet other examples, a texturing structure may be provided to adjacent sides of the device body and, in some examples, all sides of the device body. By providing a texturing structure in such orientations, multiple drive system(s), which would drive the device body in multiple directions, including laterally, may be provided and it would not be necessary to rotate either the device body or the texturing structure to apply the texturing structure to the uncured concrete surface in a changing direction of travel. As illustrated by FIGS. 1-2, an indicator light 190 is additionally provided on the concrete texturing device 100. The indicator light 190 may provide a power level indication or any other controller function indicia.

During operation of the concrete texturing device it may be necessary to rotate the device, or change direction of the device to maintain operation. In the most basic of operations, the speed of each respective drive system may be adjusted to different speeds, thereby, forcing the device body to turn. Additionally or alternatively, each respective drive system may be rotated relative to the device body forcing the body to turn. It is appreciated, however, that these manners of turning the concrete texture device may make indentations on the uncured concrete surface. This is acceptable in the instance the texture of the texture structure is coarse enough to eliminate such indentations. However, when this is not the case other manners of changing the direction of the concrete texturing device are contemplated herein.

Figure 7:
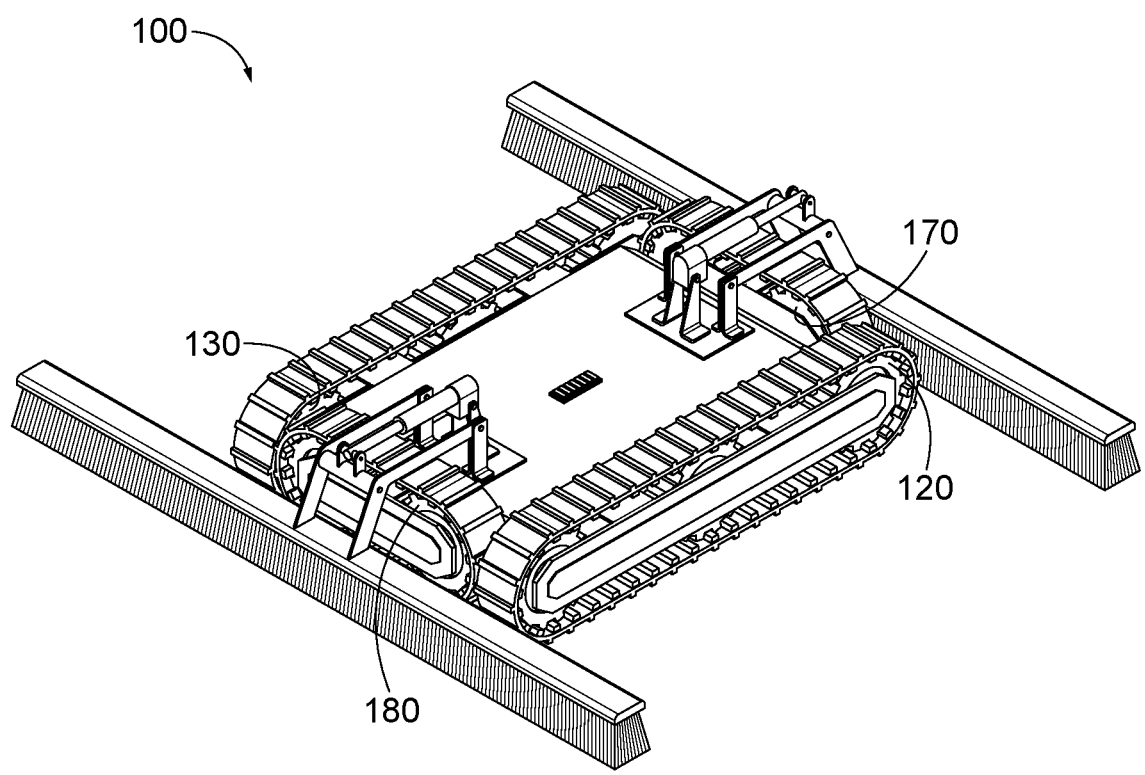
FIG. 7 is a top side perspective view of a concrete texturing device, in accordance with an example of the disclosure.

Other examples of changing the direction of the concrete texturing device include elevating the drive systems from the uncured concrete surface and reorienting the drive systems, reorienting the device body, and/or providing an opposing drive system to move the concrete texture device in a new direction. In such examples, the drive system(s) of the concrete texture devices may be raised by way of raising the device body using articulating arms in combination with the texturing structures. The drive systems may then pivot, rotate, or reorient the device body relative the articulating arms and/or pivot, rotate, reorient the drive system(s) relative the device body to position the drive system(s) in a new direction of travel. Upon the drive system(s) regaining contact with the uncured concrete surface the articulating arms may additionally pivot, rotate, or reorient relative the device body, thereby, realigning the texturing structures into the direction of travel. In another example, the entire device body, including the drive systems, may rotate or pivot relative the articulating arms and the texturing structures to be repositioned in a new direction of travel. In an example as illustrated by FIG. 7, one or more opposing drive system(s) 170, 180 may be provided where the one or more opposing drive system(s) 170, 180 contact the uncured concrete structure by being lowered onto the uncured concrete surface. The opposing drive system(s) 170,180 may, themselves, lower from the device body and/or the original drive system(s) 120, 130 may retract or be raised upward/into or toward the drive body. The opposing drive systems may then operate the concrete texturing device in a direction of travel different than the original drive system(s) 120, 130. Likewise, the articulating arms and/or the texturing structures may additionally rotate, pivot, or reorient relative the drive body to be repositioned in a driving direction of the opposing drive system(s) 170, 180. This operation may be repeated and may be done with incremental changes between the direction of travel of the original drive system and the opposing drive system until the concrete texturing structure is positioned into the desired direction of travel.

In some examples, the opposing drive systems are not positioned perpendicular to the original drive system, only, (although this example is contemplated herein) but are drive systems positioned at any angle oblique to the original drive system. Generally, it is appreciated herein that the drive system may be elevated from the uncured concrete surface in any manner in order to impart rotation or movement of the drive body, the articulating arms, the texturing structure, and/or the drive system independent of the uncured concrete surface in order to avoid creating indentations or imperfections within the uncured concrete surface due to the change in direction. Other manners of elevating these components from the uncured concrete surface may further include having a support structure, such as feet, extend from the concrete texturing device. Such feet may be in the form of a trowel, or flat surface, providing for distribution of weight across the uncured concrete surface, In other examples, the concrete texturing device may navigate from the uncured concrete surface and may change directions on an adjacent surface such as, by example, an adjacent fully cured concrete surface. Additionally, a docking station may be provided in combination with the concrete texturing device which may mate with the concrete texturing device providing for a change in direction, such as, providing a turnstile or turntable mechanism.

In some examples, multiple device bodies, having independent drive structure(s), may be used across a length of a texturing structure. This allows for an increase in the capacity of the texturing structure while reducing the weight of the concrete texturing device. This is in contrast to providing a single, much larger, device body. Further, this also allows for the weight of the texturing structure to be distributed to multiple device bodies. In still yet other examples, multiple texturing structure(s) may be braced together. In such an example, a single controlling articulating arm may control the multiple texturing structure(s) while supporting articulating arms move in a corresponding motion relative to the controlling articulating arm.

One or more actuators may be provided for controlling the drive system, the articulating arms, the orientation of the texturing structure, or any other components of the concrete texturing device. An actuator is any type of motor configured for moving or controlling a mechanism or system. In the example of an articulating arm, the actuator provides a source of energy for moving a mechanical device (e.g. gear, piston, or the like) to move the articulating arm. The sources of energy may include electric current, hydraulic pressure, pneumatic pressure, or the like. The actuator may be further connected to a controller. The controller is configured to control the amount and the direction in which the energy is exerted and may be done by way of a communication interface. In other words, an operator may control the movement by way of the controller. The controller may be provided locally at the actuator, locally on the concrete texturing device, and/or remotely. In a remote configuration, a remote fob device, or communication device, is configured to communicate (e.g. a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, and/or the like) with the concrete texturing device, such as through one or more computing devices and/or by way of a software application on the one or more computing devices. In some examples, one or more remote controllers, one or more local controls, or a combination thereof may be used. In still other examples, the controller may be remote from the concrete texturing device but connected by way of a communication cable. Power to the controller and/or the concrete texturing device may be by battery, solar, external power source, liquid fuel, gas fuel, or any other energy source known in the art.

Below provides a general overview of additional examples of a concrete texturing device. Also disclosed below are examples of methods for use.

In one example of a concrete texturing device, the concrete texturing device comprises a device body. One or more drive systems extend from the device body where the one or more drive systems operate upon an uncured concrete surface. The concrete texturing device additionally comprises at least one articulating arm. The at least one articulating arm extends from the device body. A texturing structure is further attached to the at least one articulating arm, opposite the drive body.

In another example of a concrete texturing device, the concrete texturing device comprises a device body. One or more drive systems extend from the device body where the one or more drive systems operate upon an uncured concrete surface. The concrete texturing device further comprises a first articulating arm and a second articulating arm. The first articulating arm extends from a first side of the device body and the second articulating arm extends from a second side of the device body. A first texturing structure is attached to the first articulating arm, opposite the drive body. A second texturing structure is attached to the second articulating arm, opposite the drive body. In this example, the first side of the device body may be a front side (relative a direction of travel) and the second side of the device body may be a back side (relative a direction of travel). In another example, the first side of the device body may be a front side (relative a direction of travel) and the second side of the device body may be a lateral side perpendicular to the front side. In one example, the first articulating arm and the second articulating arm may operate in unison. In another example, the first articulating arm and the second articulating arm may operate successantly.

In each of the examples of above, the concrete texturing device may further comprise driving systems that are tracks. The tracks may be continuous tracks driven by one or more drive wheels and/or drive sprockets. In some examples, wheels (independent of or in combination with tracks) may be pneumatic wheels, non-pneumatic wheels, rubber wheels, plastic wheels, hollow wheels, wheels constructed from the same materials as the texturing structure, other suitable material, a combination thereof, or the like. The tracks may be made from similar materials or construction or any such construction known in the art and/or combined with the wheels, or vice versa, to provide an interchangeable arrangement. The tracks may further comprise a tread design. In particular embodiments the tread design may comprise the same features as the texturing structure. In one specific example, the tracks may comprise bristles or tines for operating upon the uncured concrete surface.

In each of the examples above, the articulating arm(s) of the concrete texturing device may control an elevation of the texturing structure. A downward pressure may be applied to the texturing structure at an uncured concrete surface. In each of the examples above, the articulating arm(s) may control a pitch of the texturing structure. The articulation arms(s) may drive the texturing structure to engage an uncured concrete surface while the one or more drive systems maintain traction on the uncured concrete surface. The articulating arm(s) may further drive the texturing structures to engage the uncured concrete surface and lift the device body and the one or more drive systems from the uncured concrete surfaces. The texturing structure may be one of a broom or tines (e.g. metal tines). Still yet, the texturing structure may be a combination of a broom and tines.

In yet another example of the above, the concrete texturing device may further comprise one or more opposing drive systems that are oblique to the one or more original drive systems. The one or more opposing drive systems may contact the uncured concrete surface when the one or more original drive systems are elevated from the uncured concrete surface, and vice versa.

In a method for texturing an uncured concrete slab, the method comprising the steps of:

positioning a concrete texturing device on a concrete slab, the concrete texturing device comprising:
  a device body with one or more drive systems extending therefrom where the one or more drive systems operate upon an uncured concrete surface,
  at least one articulating arm where the at least one articulating arm extends from the device body, and
  a texturing structure attached to the at least one articulating arm, opposite the device body;
lowering the texturing structure into the uncured concrete slab by way of the at least one articulating arm;
traversing the uncured concrete slab with the concrete texturing device by way of the one or more drive systems with the texturing structure in the uncured concrete slab wherein the concrete texturing device is operated remotely; and
elevating the device body and the one or more drive systems from the uncured concrete slab and changing the direction of travel of the concrete texturing device.

During the step of elevating the device body and changing the direction of travel of the concrete texturing device the change in direction of travel is achieved by driving one or more opposing drive systems at an angle oblique to the one or more original drive systems which are further elevated above the uncured concrete slab. The method for texturing an uncured concrete slab may further include traversing the concrete slab in a first direction with a first texturing structure in an uncured concrete slab and traversing the concrete slab in a second direction with a second texturing structure in the uncured concrete slab during the step of traversing the concrete slab.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A concrete texturing device comprising:
   a device body with one or more drive systems extending therefrom where the one or more drive systems operate upon an uncured concrete surface;
   a first articulating arm and a second articulating arm where the first articulating arm extends from a first side of the device body and the second articulating arm extends from a second side of the device body; and
   a first texturing structure attached to the first articulating arm, opposite the device body, and a second texturing structure attached to a second articulating arm, opposite the device body and the first articulating arm and the second articulating arm each control an elevation of the first and second texturing structures, respectively, and a downward pressure is applied to at least one of the first and second texturing structures and the uncured concrete surface;
   wherein the first texturing structure and the second texturing structure add a texture to the uncured concrete surface; and
   wherein the one or more drive systems, the first articulating arm, the second articulating arm, the first texturing structure, and the second texturing structure operate above the uncured concrete surface.

2. The concrete texturing device of claim 1 where the first side of the device body is a front side and the second side of the device body is a back side opposite the front side.

3. The concrete texturing device of claim 1, wherein the first articulating arm and the second articulating arm elevate the device body and the one or more drive systems from the uncured concrete surface.

4. The concrete texturing device of claim 1 where the one or more drive systems are tracks.

5. The concrete texturing device of claim 4 where the tracks comprise a tread design.

6. The concrete texturing device of claim 5 where the tread design is a texturing structure.

7. The concrete texturing device of claim 1 where the first and second texturing structures are a combination of at least a broom or tines.

8. The concrete texturing device of claim 1 where the first articulating arm and the second articulating arm each control a pitch of the first and second texturing structures, respectively.

9. The concrete texturing device of claim 1 where the first articulating arm and the second articulating arm operate in unison.

10. The concrete texturing device of claim 1 where the first articulating arm and the second articulating arm operate successantly.

11. The concrete texturing device of claim 1 where the first articulating arm and the second articulating arm drive the first and second texturing structures, respectively, to engage the uncured concrete surface and lift the device body and the one or more drive systems from the uncured concrete surface.

12. The concrete texturing device of claim 1 where the first articulating arm and the second articulating arm engage the uncured concrete surface while the one or more drive systems maintain traction on the uncured concrete surface.

13. The concrete texturing device of claim 1 that is symmetrical about a central longitudinal axis and/or symmetrical about a central lateral axis.

14. The concrete texturing device of claim 1 further comprising one or more opposing drive systems oblique to the one or more drive systems where the one or more opposing drive systems are in contact with the uncured concrete surface when the one or more drive systems are elevated from the uncured concrete surface.

15. The concrete texturing device of claim 1 where the first and second texturing structures are one of a broom or tines.

16. A concrete texturing device comprising:
    a device body with one or more drive systems extending therefrom where the one or more drive systems operate upon an uncured concrete surface;
    at least one articulating arm where the at least one articulating arm extends from the device body; and
    a texturing structure attached to the at least one articulating arm, opposite the device body;
    wherein the texturing structure adds a texture to the uncured concrete surface; and
    wherein the one or more drive systems, the at least one articulating arm, and the texturing structure operate above the uncured concrete surface.

17. The concrete texturing device of claim 16, wherein the at least one articulating arm elevate the device body and the one or more drive systems from the uncured concrete surface.

18. A method for texturing an uncured concrete slab, the method comprising the steps of:
    positioning a concrete texturing device on a concrete slab, the concrete texturing device comprising:
       a device body with one or more drive systems extending therefrom where the one or more drive systems operate upon an uncured concrete surface,
       at least one articulating arm where the at least one articulating arm extends from the device body, and
       a texturing structure attached to the at least one articulating arm, opposite the device body;
    lowering the texturing structure into the uncured concrete slab by way of the at least one articulating arm;
    traversing the uncured concrete slab with the concrete texturing device by way of the one or more drive systems with the texturing structure in the uncured concrete slab and adding a texture to the uncured concrete surface;
    wherein the concrete texturing device is operated remotely and wherein the one or more drive systems, the at least one articulating arm, and the texturing structure operate above the uncured concrete surface.

19. The method for texturing an uncured concrete slab of claim 18 where the step of traversing the concrete slab includes traversing the concrete slab in a first direction with a first texturing structure in the uncured concrete slab and traversing the concrete slab in a second direction with a second texturing structure in the uncured concrete slab.

* * * * *